June 25, 1968 J. H. LEMELSON 3,389,814
LOAD RESPONSIVE CONTROL MEANS FOR A MATERIAL HANDLING APPARATUS
Original Filed Feb. 3, 1965 2 Sheets-Sheet 1

INVENTOR
JEROME H. LEMELSON
By Meyer, Baldwin, Doran & Egan
ATTORNEYS

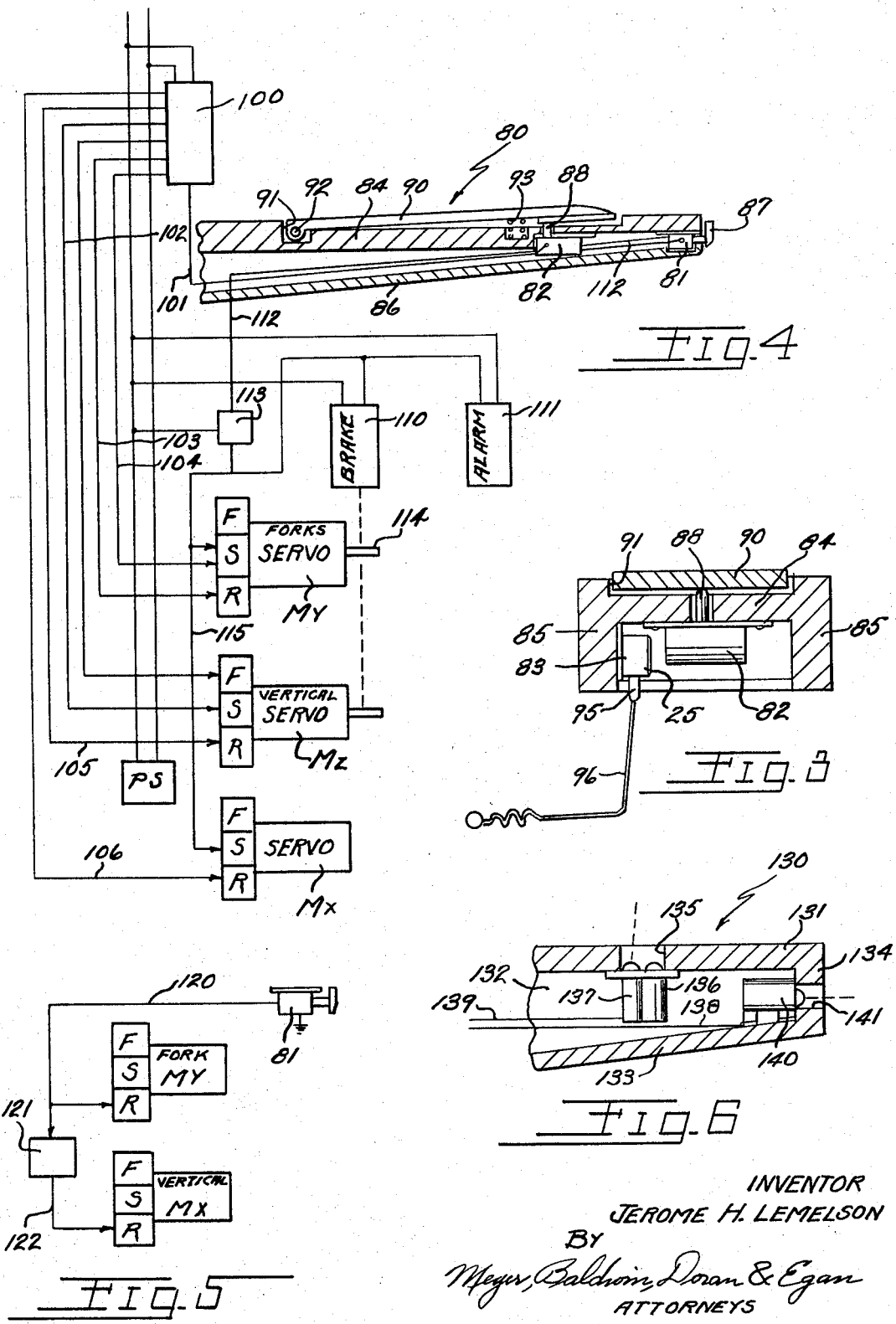

Patented June 25, 1968

3,389,814
LOAD RESPONSIVE CONTROL MEANS FOR A
MATERIAL HANDLING APPARATUS
Jerome H. Lemelson, Metuchen, N.J., assignor to The
Triax Company, Cleveland, Ohio, a corporation of
Ohio
Continuation of application Ser. No. 430,075, Feb. 3,
1965, which is a continuation-in-part of application Ser.
No. 152,702, Oct. 17, 1961, which is a division of applications Ser. No. 449,874, July 28, 1954, and Ser. No.
219,357, Aug. 13, 1962. This application June 7, 1966,
Ser. No. 561,307
14 Claims. (Cl. 214—16.4)

This invention relates to improvements in automatic warehousing apparatus and is a continuation of U.S. application Ser. No. 430,075 filed Feb. 3, 1965, now abandoned, which is a continuation-in-part of my copending application, Ser. No. 152,702 entitled Automatic Production Systems, filed Oct. 17, 1961 now abandoned, (said application being a division of the application Automatic Warehousing Systems, Ser. No. 449,874, filed July 28, 1954, now abandoned) and Ser. No. 219,357, entitled Automatic Storage Apparatus, filed Aug. 13, 1962, now abandoned.

In my copending application Ser. No. 152,702, an automatic warehousing apparatus is disclosed which comprises a so-called stacker crane which is movable along a track, such as an overhead monorail, and is programmed in its operation to either store an article or palletized load, disposed on its material handling load support means or forks, or to retrieve from storage a preselected article or load. While the control for each apparatus may be completely programmed and effected by means of a signal generating programming device, such as a multi-circuit presettable timer or signals generated from the reproduction of a recording thereof, it is preferable that such control be effected by resort to interlocking control means at one or more points in the operation. An interlocking control such as a limit switch or sensing device will assure that the next portion of the control cycle will not begin until the previous portion of said cycle has been completed. Accordingly, a primary object of this invention is to provide improvements in the automatic control system for an automatic warehousing apparatus which will permit efficient operation of said apparatus without delays or interruptions in the sequential operation of the various servo motors of the system.

Another object is to provide an improved automatic warehousing apparatus including automatic means for sensing the presence of an article, pallet, or load on the material handling fixture or load support means of the apparatus, or the forks of a crane, said sensing means being operative to initiate the next portion of the control cycle and to effect activation of a plurality of controls.

Another object is to provide, in an automatic warehousing apparatus, means for sensing the absence of a load on the load support means of an automatic conveying apparatus and means for either automatically indicating at a remote location when a load is not present thereon or automatically deactivating further control of said apparatus.

Another object is to provide sensing means associated with an automatic conveying apparatus having a load support means or fork means operative to receive and discharge palletized loads and the like, the sensing means comprising, in addition to means for electrically sensing the presence of the load on said forks, means also for sensing the presence of the load or obstacle immediately in front of said load support means and operative to prevent damage to either the load or apparatus by automatically deactivating the means driving the load support means.

Other objects of the invention and the invention itself will be readily understood from the following description of three embodiments of the invention.

FIG. 3 is a cross section through a portion of the load support means showing yet another switch carried thereby.

FIG. 4 is a schematic view of specific details of the control system in association with modified switch means carried by the load support means.

FIG. 5 is a detail of control means associated with one of the switches shown in FIG. 4.

FIG. 6 is a further modification of the switch arrangement shown in FIG. 4.

Figure 1:
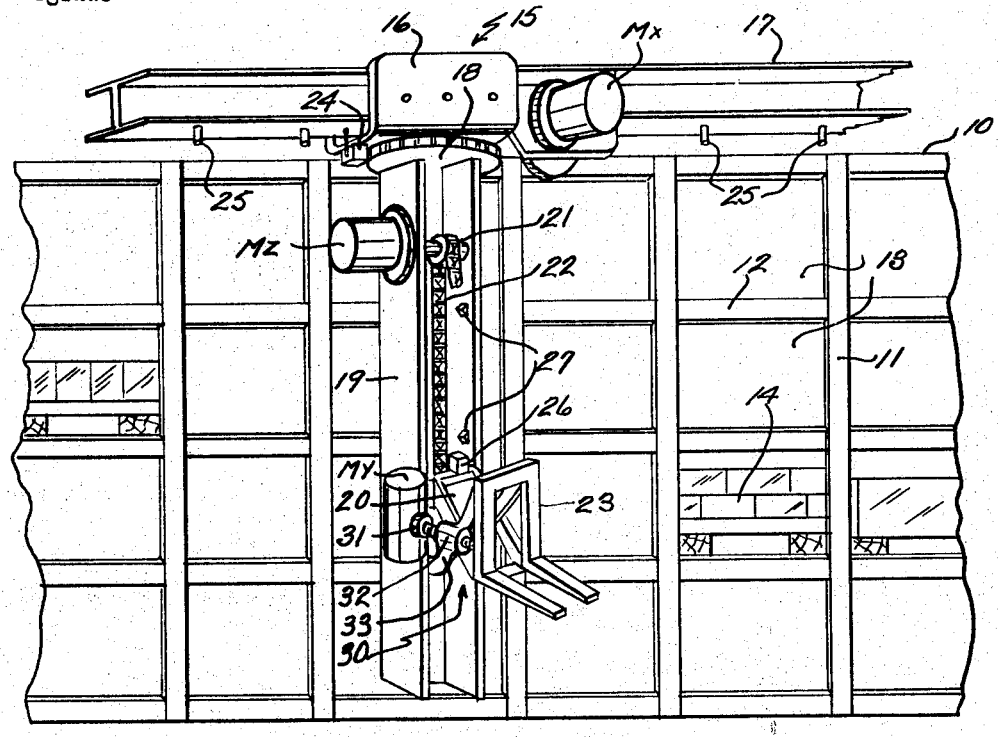
FIG. 1 shows a perspective view of a portion of a storage rack with a load carrier means positioned alongside thereof.

Referring now to FIG. 1 of the drawings, an exemplary warehousing system for use with the control means of this invention comprises a storage frame 10 of skeletal form made up of vertical and horizontal members 11 and 12 respectively which define a multiplicity of vertically and horizontally aligned, open faced storage bins 13. The bins 13 are arranged in vertical bays along an aisle which may have a mirror image storage frame disposed on the other side thereof.

Means for transferring a palletized load, such as that shown at 14, from any desired location to a selected bin or from a selected bin to any desired location is provided in the form of a carrier 15. The carrier 15 comprises a carriage 16 mounted for rolling engagement along an overhead track 17. The track 17 is disposed above and parallel with the aisle whereby the carriage 16 moves horizontally adjacent to the upper edge of the storage frame 10. The carriage 16 is power driven along the overhead track 17 by a motor MX and associated driving means.

The carriage 166 carries a turntable 18 adjacent to its bottom surface which said turntable, in turn, supports a vertical column 19. The column 19 extends downwardly with its lower end spaced only a slight distance above the floor or base surface upon which the entire warehousing system is built. An elevator 20 is mounted for travel up and down the column 19 which said column may be U-shaped in horizontal section to accommodate said elevator therein. A motor MZ carried by the column 19 elevates and lowers the elevator 20 by any suitable means such as a gear 21 and associated chain 22.

The elevator 20 carries a horizontally movable load support means 23, here shown in the form of a pair of lift forks, said load support means being horizontally movable toward and away from the column 19 by any suitable mechanism, such as that shown at 30. Said mechanism comprises a reversible motor MY which rotates a worm 31, said worm engaging a threaded collar 32. The collar 32 is connected to a scissor-blade, parallel linkage 33 secured to the elevator 20 at one end and the load support means 23 at the other. It will be readily understood that the support means 23 can be caused to move toward or away from the elevator 20 by rotation of the worm 31 in one direction or the other.

The load support means 23 can be rotated to either side of the aisle by the turntable 18 whereby it can be used to insert or withdraw a load in one of the bins 13 or pickup or deposit a load on a conveyor or the like (not herein illustrated) on the opposite side of the aisle. The turntable 18 may be either motor driven or manually turned by grasping the lower end of the column 19.

It is preferred that the general warehousing system or arrangement described above be controlled by automatic control means such as those set forth in my above referred to applications. In general, it is anticipated that the carriage 15 will be adapted to start from a beginning or pickup station at one end of the aisle and move horizontally along the overhead track 17, at the same time automatically counting the bays by means of a horizontal counter switch 24 adapted to be sequentially tripped by trips 25 of said overhead track. Similarly, it is anticipated that the elevator 20 is adapted to carry a vertical counter switch 26 which may, for example, count the vertical row of bins in each bay by contacting trips 27 carried on or in the column 19.

It will be understood that each of the motors MX, MZ and MY is provided with a cooperating brake which is self-energized upon de-energization of the associated motor whereby coasting of any of the movable elements described in the carrier is substantially eliminated.

The basic operation of the exemplary warehousing system shown comprises the movement of the carrier 15 along the aisle from a beginning or start position with the load support means 23 turned toward the storage frame on one side of the aisle. If the carrier is going to pick up a load, the load support means 23 or, as herein illustrated, the forks, will be initially empty. As the carriage 16 moves along the track 17 the vertical bays are counted by the switch 24, and means are provided for stopping the carriage at a selected bay. Simultaneously therewith or subsequently thereto, the elevator 20 moves vertically to a selected bin level and is stopped at a selected bin by means associated with the vertical counter-switch 26. Thereafter, the motor MY moves the load support means 23 into the bin under the load 14, the motor MZ moves the load support means upwardly sufficiently to lift said load free of the bin supporting surface, and said motor MY moves said load support means back into the aisle with the load thereon whereby it can be subsequently transferred either back to the start position, to a different unloading position, or to another storage bin. Depositing a load, which is initially on the load support means 23 at the start position of the carrier 15, is effected by a reverse motion of said load support means whereby it is moved inwardly of the bin by the motor MY with the load disposed slightly above the load carrying surface of the bin, it is lowered, and it is then retracted into the aisle thereby leaving the load at the selected bin.

Figure 2:
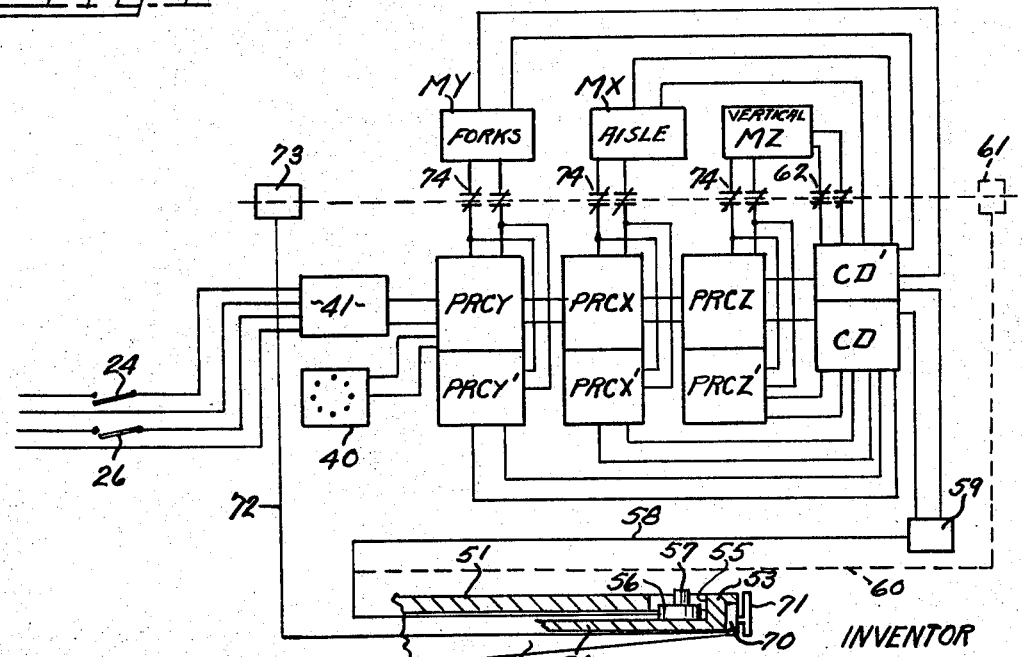
FIG. 2 is a schematic view showing general control means for a storage system and the interconnection therewith of switches carried by a load support means of the carrier.

FIG. 2 shows a schematic control system for controlling the carrier, elevator, and load support means in the above described sequences of movements for depositing or picking up loads at the storage frame 10. The rectangles designated PRCY, PRCX and PRCZ, represent predetermining command devices for controlling the motors MY, MX and MZ respectively. Said predetermining command devices may comprise counters, each one adapted to open and close one or more switches for controlling its associated motor. They may comprise mechanical counting mechanisms or electrical counting switches which are usually arranged in banks to be actuated by electrical impulses received by one or more position locating devices. The predetermining control devices PRCY, PRCX and PRCZ, may be used to control their associated motors for causing a first half of the cycle wherein the carriage 16 and the elevator 20 move the load support means 23 to a preselected bin with the command device PRCY causing the load support means to move into said selected bin. A similar, corresponding bank of command devices designated PRCY', PRCX' and PRCZ' may be used to cause the reverse of these actions for moving the load support means 23 out of the bin and returning it empty or loaded to a start position.

For manually setting of the command devices PRCY, PRCY', PRCX, PRCX', PRCZ and PRCZ' it is preferable to use a dial operated switching device as shown at 40 in FIG. 2, said device being similar to the dial switch utilized in the conventional telephone. Such device may be used to cause a series of pulses of current, depending on the number dialed, to actuate a solenoid or close relays in a bank as in a telephone control circuit. Each signal operated by the dial device 40 may be used to open one of said relays, and the opening of a preset group of said relays may cause opening of a switch in circuit with a particular motor control. Predetermining electrical counting and control devices are known to the art and may be of various designs. For this reason, in the schematic showing of FIG. 2, said control devices are shown merely as boxes which are electrically connected to each other for the purpose of starting each to operate in sequence.

At CD and CD' I show special control devices for determining whether the load support means 23 will pick up a load at a selected storage bin or whether it will deposit a load thereat. The command device CD is used to control the automatic action of the load support means 23 when traveling empty from the aisle opposite a selected bay whereby it will move into said bay, move upwardly to pick up a load, and thereafter return with the load to the aisle. The command device CD', on the other hand, controls the automatic action of said load support means when it is initially carrying a load at the aisle position and causes it to move into the selected bin, lower the load onto the bin support surface, and return empty to the aisle position.

It is anticipated that either the command device CD or CD' may be thrown into circuit at the dial device 40 whereby one of them is locked in with the vertical and horizontal counters PRCZ and PRCX, respectively, to cause the desired pickup or delivery sequence of motions of the load support means 23. Said command devices CD and CD' may be any mechanical or electrical devices which will open and close circuits to the motors MZ and MY after a specific number of rotations of said motors and in a sequence which will drive the forks in either of the two desired sequence of movements. The rectangle designated 41 represents a feedback controller which receives momentary pulsations caused by the closings of the horizontal counterswitch 24 and the vertical counter-switch 26, said feedback controller routing these impulses to the command devices PRCX and PRCZ thereby causing them to uncount as the apparatus is moved toward the locations predetermined by use of the dial device 40. The return or reverse command devices indicated by the primed letters may be actuated by the same or similar switches and may be set up either by the dial device 40 or by the counting out of the command devices PRCY, PRCX and PRCZ.

The lower portion of FIG. 2 shows a fork 50 of the load support means 23 which said fork is hollow in form having an upper wall 51 flanked by depending side walls 52. An end wall 53 is disposed at the distal end of the fork 50 from which there is provided a rearwardly projecting, intermediate wall 54. A cavity 55 is provided in the upper wall 51 above the intermediate wall 53 for mounting a compression or load sensing switch 56 having an upwardly projecting operative member 57 projecting upwardly above the upper surface of the upper wall 51. The load sensing switch 56 is adapted to be closed in the act of the forks being moved to the bottom of a load or when a load is placed thereon. The load contacts the operative member 57 thereby closing the switch and completing a circuit through a line 58. The line 58 is, in turn, connected to a selector relay 59 which, when energized, determines that the load support means 23 will execute a depositing motion at the selected storage bin rather than a picking up sequence of motions. When there is no load depressing the operative member 57, the selector relay determines that the command device CD will be effective and that the load support means will execute a picking up sequence of movements at the selected storage bin.

From the foregoing, it will be readily understood that when using a load sensing switch 56, it is not necessary when setting up the storage cycle at the dial device 40 to also determine which of the command devices CD or CD' will be effective. The command device CD will be automatically effective to cause the forks to pick up a load if there is no load already on the forks and the load sensing switch is not actuated; the command device CD' will automatically be effective to cause the load support means to execute a depositing motion if there is a load on the forks and the load sensing switch 56 is closed.

An alternative use of the load sensing switch 56 is indicated in broken lines by the alternative circuit through line 60 to a relay 61 controlling contacts 62. The contacts 62 are normally closed and are disposed in the lines between the vertically acting motor MZ and the command devices CD and CD'. In this instance, the load sensing switch 56 is used to stop the upward movement of the load support means as it picks up a load by energizing the relay 61 and opening the contacts 62.

The fork 50 also carries at its distal end a reject sensing switch 70 having an operative member 71 projecting forwardly beyond the end of said fork. The operative member 71 is so positioned that if the carrier 15 attempts to deposit a load at a bin already occupied by another load, said operative member will strike said other load as the forks move into the bin, thereby closing the reject switch 70. In this instance, said reject switch energizes a solenoid 73 through line 72, said solenoid, in turn, opening normally closed contacts 74 in the lines energizing the motors MY, MX and MZ. Thus, whenever the reject switch 70 is actuated, all motors and all movement of the carrier stop.

The only time a stoppage such as described above is desired is when the forks are loaded. In this instance, the load support means 23 will be scheduled for a load depositing sequence of movements at the selected storage bin which means that it will move into the bin in a high position for the purpose of subsequently lowering the load. In this high position, the operative member 71 is at such level that it will strike a load already in the selected bin. If the load support means 23 is empty, it will be scheduled for a picking up sequence of movements which means that it will enter a selective storage bin in the low position, and in these circumstances, the operative member 71 will pass under a load already at the selected storage bin and will not cause a shutdown of the carrier 15.

FIGS. 3 and 4 illustrate details of modified electromechanical switching control means operative for electrically detecting the presence of a load disposed on or adjacent to the load support means or forks of an article transfer apparatus such as the carrier 15. A modified fork 80 of the load support means 23 is provided with three limit switch devices, 81, 82 and 83 for respectively detecting the presence of an article or obstruction at the forward end or tip of the fork, a load resting on top of the fork, or an article or obstruction disposed adjacent to and along the side walls of the fork.

The fork 80 is hollow having an upper wall 84, depending side walls 85, and a bottom wall 86. The limit switch 81 is mounted adjacent to the distal end of the fork 80 and is substantially a duplicate of the reject switch 70, said reject switch 81 having a forwardly projecting operative member 87 for abutting a load which is already in a selected storage bin to which another load is being transferred.

The switch 82 is a load sensing switch similar to the load sensing switch 56, said switch 82 being secured to the under side of the top wall or upper wall 84 and having an operative member 88 which is depressed to close contacts of the switch 82. An elongated plate 90 is pivoted at one end thereof within a channel 91 in the upper surface of the upper wall 84 by a pivot pin 92 carried by said upper wall. The pivot pin 92 is located a substantial distance inwardly from the distal end of the fork 80, and the plate 90 extends forwardly and rests on or is disposed just above the upper end of the operative member 88. A spring 93 resiliently holds the plate 90 upwardly whereby it normally does not actuate the switch 82. It will be readily understood that a load positioned upon the modified fork 80 will depress the plate 90 downwardly into the channel 91 thereby also depressing the operative member 88 and actuating the load sensing switch 82. The plate 90 extends a substantial distance along the length of the fork 80 thereby affording a greater load detecting area or extent than would be obtained by the mere presence of the operative member 88 alone. When a load is removed from the fork 80, the spring 93 moves the non-pivoted end of the plate 90 upwardly thereby allowing the load sensing switch 82 to open.

The limit switch shown at 83 is a side detector switch having an operative member 95 which actuates said switch 83 when deflected laterally of the fork 80. A flexible, elongated, L-shaped arm or feeler 96 is carried by the operative member 95 and projects downwardly and laterally beyond the fork 80 where it will strike an obstruction before said obstruction can engage said fork. The switch 83, when actuated, is adapted to stop movement of the fork thereby preventing collision damage between the fork and an obstruction.

FIG. 4 illustrates an exemplary means of connecting the switches 81 and 82 for their use in an automatic warehousing system. The switch 82 is operatively connected to the energizing input of an automatic controller 100 through line 101 extending through the interior of the hollow fork 80. A power supply PS provides electrical energy for operating the controller 100 as well as the other illustrated servo and switching devices. Controller 100 may, in its simplest form, comprise a plurality of delay relays or a multi-icrcuit self-recycling timer energized each time it receives a pulse upon activation of switch 81. Said controller is operative to generate control signals on a plurality of outputs thereof each of which is connected to a respective control for a servo device including the motor MY which is operative to drive the load support means 23 in a direction parallel with the longitudinal axis of the forks. The controller 100 also has control outputs connected to controls for the motor MZ which is operative to drive the elevator 20 in a vertical direction.

Assuming that the load support means 23 is controlled by a command device CD to position the forks beneath a pallet or tote box and is further operative to move the forks in an upward direction whereby the load is engaged on the upper surface of the forks, upon effecting such engagement, the plate 90 is forced to move in a downward direction thereby activating the load sensing switch 82. Closure of contacts in the switch 82 operates to energize the multi-circuit controller 100, and a first signal is passed on a line 102 of said controller to the stop control S of motor MZ thereby stopping said motor MZ and terminating the upward movement of the forks. Thereafter, a second signal of the controller 100 passes on a line 103 to the reversing control R of the motor MY causing said motor to operate to retract the forks and remove the load from its particular storage bin. The motor MY operates for a predetermined period of time as determined by the operation of controller 100 which time is sufficient for the forks to completely clear the bins of the storage bay so that further horizontal or vertical movement of the carrier 15 will not result in interference between the carrier components or load, and the frame. Another line 104 of the controller 100 extends to the stop control S of the motor MY effecting termination of the reverse movement of the forks. Lines 105 and 106 respectively are connected to the reverse control R of motor MZ and the reverse control R of the motor MX thereby driving the load support means vertically downwardly and rearwardly along the aisle back to the start position.

Also illustrated in FIG. 4 is a braking device 110 and an alarm 111, both of which are operated upon activation of the reject switch 81 as the end of the fork 80 engages an obstacle during its movement into a bin 13. A line 112 extends from the reject switch 81 to a relay 113 which is energized upon closure of said switch 81 and is operative to energize the stop control S of the motor MY, the brake 110 which is coupled to a drive shaft 114 of said motor, and the alarm 111. Said alarm is operative to warn operating personnel that the load support means 23 has engaged an obstacle. If a safety interlock for lateral movement of the load support means is utilized, such as the side detector switch 83, the contacts of said side detector switch may also be connected through the circuit 112 to the relay 113 so that activation of either of the two switches 81 or 83 will result in the simultaneous braking of all moving components of the crane as well as sound of an alarm. Accordingly, the output of the relay switch 113 is also shown connected to the stop control S of the motor MX, through line 115, which said motor MX drives the carriage 16 along the overhead track 17.

FIG. 5 illustrates means for utilizing the reject switch 81 in a manner to retract the platform and return it to a starting or home position upon actuation of said reject switch. Actuation of said reject switch generates a pulse signal which is transmitted through a line 120 to the reverse control R of the motor MY. The same pulse is also transmitted to energize a time delay relay 121 which is operative thereafter to energize the reverse control R of the motor MX through a line 122. The interval of the time delay effected by the relay 121 is such as to permit the forks of the load support means 23 to completely clear the storage frame D. Energization of the control R of the motor MX reseults in driving the carrier 15 along its track 17 in a reverse direction which said travel may be terminated by the activation of the stop control S of said motor MX by automatic means as provided in my said applications. Stoppage of the motor MY is also effected by a limit switch actuated when the platform or forks are completely retracted into the elevator 20.

FIG. 6 illustrates an arrangement whereby the hereinabove described electro-mechanical limit switches are replaced by photoelectric scanning means for detecting articles disposed on the upper surface of the load support means 23 or immediately adjacent to the forward end of the forks. A further modified fork 130 of hollow construction is provided with an upper wall 131, depending side walls 132, a bottom wall 133, and an end wall 134 which said end wall is disposed at the distal end of the fork. A first opening 135 is provided in the upper wall 131 through which a photo-electric scanning device 136 is operative to scan in an upward direction. Said device 136 may comprise a light source 137 and a photo-electric cell 138, situated adjacent to each other, and includes circuitry through a line 139 which is operative to generate a control signal when an article is disposed on the upper surface of the top wall or upper wall 131 of the fork and reflects light passed through the opening 135 from said light source and back to said cell. Energization of the circuit through line 139 is effective for further controlling movement of the forks in the manner described in connection with the load sensing switches 56 and 82.

A second photo-electric cell 140 is mounted just behind the end wall 134 and is adapted to scan outwardly through an opening 141 in said end wall. The cell 140 is adapted to remain activated as long as it scan ambient light passing through the opening 141, but upon movement of said end wall towards or against an obstacle, which is operative to prevent the ambient light from passing through said opening, said cell 140 becomes deactivated. By employing proper control circuitry, a controller situated within the same housing and connected to the cell 140 through a line 142 may be operative to generate an output signal on the line 112 which is operative to effect braking of the various moving components and sounding of the alarm. Depending upon the ambient light conditions available in the transfer or warehousing environment, either or both of the photo-electric sensing devices 136 and 140 may be employed for scanning through openings disposed upwardly, forwardly, or to the side of the fork or load support means for detecting the presence of an article, container, pallet, frame member, or other obstacle and for effecting the control modes hereinabove described.

What is claimed is:

1. Material handling apparatus for transporting loads to and from selected storage locations, said apparatus comprising a storage frame defining a multiplicity of vertically and horizontally arranged bins having open, load receiving ends, a load carrier including a carriage movable past said open ends of said bins; said load carrier including generally vertically extending horizontally movable mast structure supported by said carriage and a veritcally movable elevator guided by said mast structure; a laterally movable load support means carried by said elevator and movable generally horizontally into said bins; power means for actuating said carriage, elevator and load support means; automatic control means for effecting a series of movements whereby said carriage is moved to the horizontal position of a selected bin and said elevator is moved to the level of said selected bin, and said load support means is reciprocated laterally in a transfer movement to transfer a load between said load support means and said selected bin, said control means including a first sequence control effecting an unloading movement whereby said load support means enters said selected bin in a high position and is lowered to deposit a load; said control means including a second sequence control effecting a loading movement whereby said load support means enters said selected bin in a low position and is raised to pick up a load; said load support means being so mounted with respect to said elevator that said load support means is disposed in spaced relationship to the defining storage frame elements of the selected bin during movement of said load support means into and out of said selected bin for respectively depositing a load into or removing a load from the selected bin; said control means including load sensing means on said load carrier selecting either said first sequence control or said second sequence control for activation during said sequence of movements, said load suport means including a generally horizontal upwardly facing surface adapted for supporting a load thereon, and said sensing means being operatively connected to said load suport means and responsive to a load positioned on said surface for activating said first sequence control and responsive to no load positioned on said surface for activating said second sequence control, and other sensing means on said load carier for determining whether or not a load is already positioned in said selected bin, said control means being responsive to actuation of said other sensing means and preventing said load support means from moving into said selected bin.

2. Material handling apparatus in accordance with claim 1 including means wherein one of said sequence controls at the completion of its operation automatically initiates the other of said sequence controls.

3. Material handling apparatus in accordance with claim 1 wherein said load receiving ends of said bins are disposed along an aisle and said load carrier is movable along said aisle, and including further sensing means mounted to move with said load support means, said further sensing means having an actuating member being actuatable upon contact of said further sensing means with an engaged object to cause said load carrier to stop, and said further sensing means being in a position to sense an object struck by movement of said load support means vertically and parallel to said aisle when said load support means is extended crosswise of said aisle, whereby to prevent said load support means from destructive engagement with said storage frame or material extending therefrom.

4. Material handling apparatus in accordance with claim 1 including further sensing means mounted to move with said load carrier and actuatable by an object disposed closely adjacent to said load support means, said further sensing means being operatively coupled to said control means to activate said control means upon sensing an object adjacent to said load support means and to affect the movement of said load support means, said further sensing means comprising an elongated feeler projecting beyond one side of said load support means for sensing an obstacle.

5. Material handling apparatus in accordance with claim 1 wherein said load suport means is movable laterally from said elevator in cantilever fashion into and out of the selected bin.

6. Material handling apparatus in accordance with claim 1 including signal means responsive to actuation of said other sensing means.

7. Material handling apparatus in accordance with claim 1 wherein said control means includes means operative upon activation of said other sensing means to cause said sequence to be interrupted and cause said load carrier to return to its beginning position.

8. Material handling apparatus in accordance with claim 1 wherein the first mentioned sensing means is mounted on said load support means and projects upwardly for coaction with a load on the load support means.

9. Material handling apparatus in accordance with claim 1 wherein said other sensing means is mounted on said load support means and projects outwardly from the leading end thereof.

10. Material handling apparatus in accordance with claim 1 wherein the first mentioned sensing means comprises a photo-electric sensor.

11. Material handling apparatus in accordance with claim 1 wherein said other sensing means comprises a photo-electric sensor.

12. Material handling apparatus in accordance with claim 1 wherein the first mentioned sensing means comprises photo-electric sensing means mounted on said load support means, said surface having a generally vertically oriented opening therethrough, and said photo-electric sensing means being directed upwardly through said opening in said surface.

13. Material handling apparatus in accordance with claim 1 wherein said other sensing means comprises a photo-electric sensor mounted on said load carrier and operative to sense in a generally horizontal direction for detecting a load already positoned in the selected bin.

14. Material handling apparatus in accordance with claim 1 wherein the first mentioned sensing means comprises a switch having an actuator member, and a movable plate member is disposed closely adjacent to said actuator member whereby a load of said load support means moves said plate member to trip said switch.

References Cited
UNITED STATES PATENTS

| | | | |
|---|---|---|---|
| 2,386,520 | 10/1945 | Watson et al. | 214—16.4 |
| 2,451,368 | 10/1948 | White et al. | 214—16.1 |
| 2,602,557 | 7/1952 | Sinclair | 214—16.1 |
| 2,691,448 | 10/1954 | Lontz | 214—16.1 |
| 2,847,131 | 8/1958 | Miller | 214—16.1 |

ROBERT G. SHERIDAN, *Primary Examiner.*

GERALD M. FORLENZA, *Examiner.*

R. B. JOHNSON, *Assistant Examiner.*